Aug. 3, 1937. H. L. MURRAY 2,089,132
METHOD OF PASTEURIZING AND DEODORIZING LACTEAL FLUIDS UNDER VACUUM
Filed March 20, 1933 3 Sheets-Sheet 1
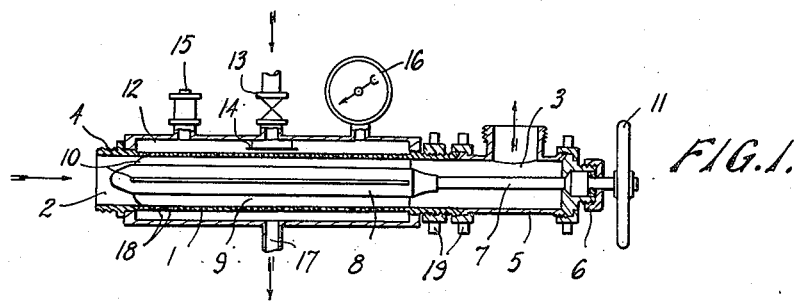
FIG.1.
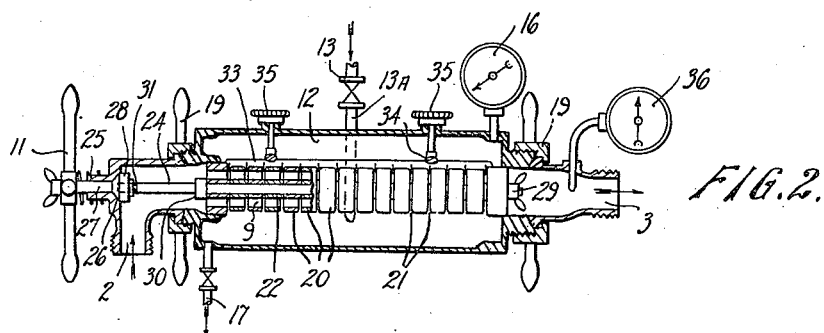
FIG.2.
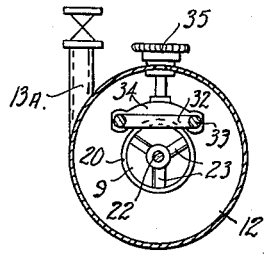
FIG.3.
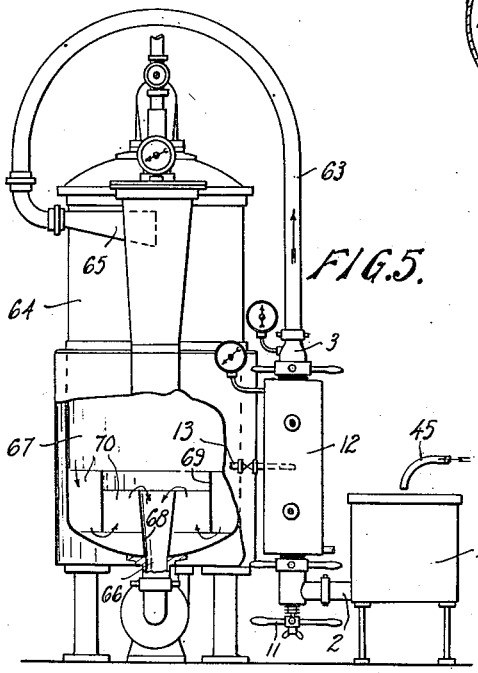
FIG.5.
FIG.4.
Inventor:
H. L. Murray
By C. F. Wendroth
atty

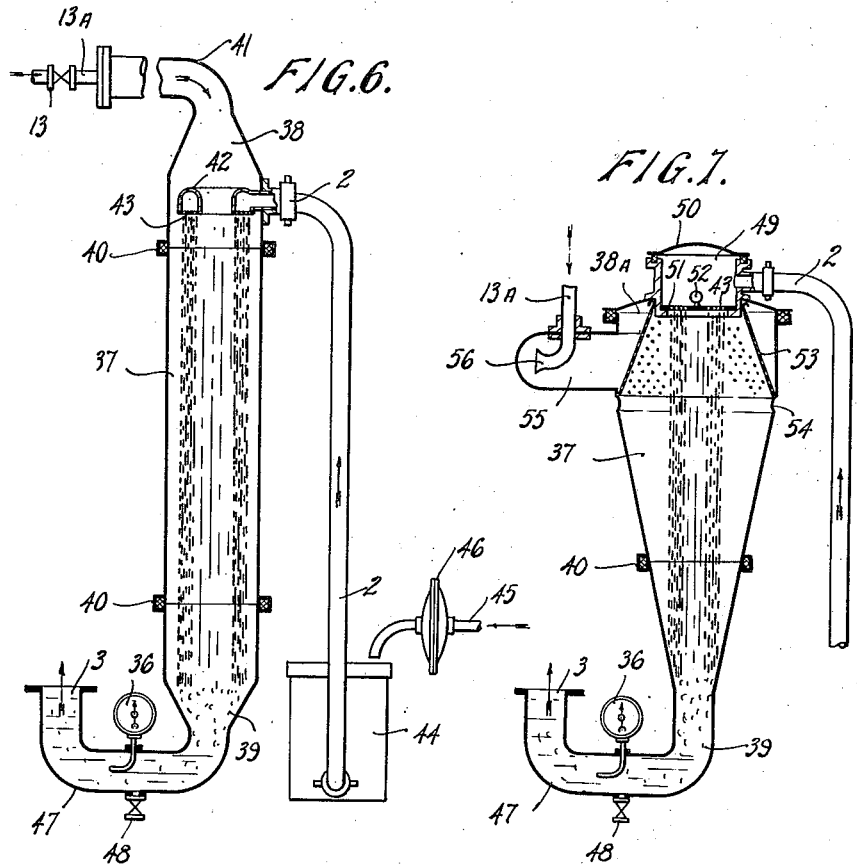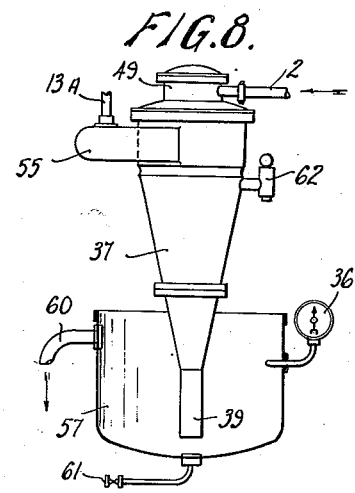

Aug. 3, 1937.  H. L. MURRAY  2,089,132
METHOD OF PASTEURIZING AND DEODORIZING LACTEAL FLUIDS UNDER VACUUM
Filed March 20, 1933  3 Sheets-Sheet 3

Inventor:
H. L. Murray
By E. F. Wendroth
Atty

Patented Aug. 3, 1937

2,089,132

UNITED STATES PATENT OFFICE 2,089,132

METHOD OF PASTEURIZING AND DEODORIZING LACTEAL FLUIDS UNDER VACUUM

Henry Lamont Murray, Epsom, Auckland, New Zealand, assignor to Murray Deodorisers Limited, Auckland, New Zealand, a company of New Zealand Application March 20, 1933, Serial No. 661,851
In New Zealand May 26, 1932

10 Claims. (Cl. 99—61)

The present invention has for its primary object a method of and apparatus for, the continuous pasteurization and deodorization of lacteal liquids or the like, such as cream, under vacuum.

It has previously been proposed to simultaneously pasteurize and deodorize cream under vacuum by a batch process, but same has not come into commercial use owing to a variety of technical objections, of which possibly the most relevant is the injurious effect of the process on the body of the cream.

It has been also primarily proposed to pasteurize cream, milk or the like by direct injection of steam at a comparatively high pressure or velocity, such proving satisfactory only in cases where the concussion effected has not been detrimental to the article. Thus it has been found practicable in the handling of whey, but not of cream.

It has been found by experience that where pasteurization in the usual manner under atmospheric conditions, is followed by deodorization, the additional concussion and treatment given to cream during deodorization results in many cases in a higher fat loss during churning, but by the present process of pasteurizing under vacuum it is found that under usual conditions the fat loss even when such pasteurization is followed by deodorization is usually less than that occasioned by pasteurization alone under present "flash" conditions.

Amongst the advantages attendant upon vacuum pasteurization, the following are the most pertinent:—Reduction of churning losses and increased overrun; improved pasteurizing efficiency; avoidance of scorched, cooked or stewed flavours; minimum interference with vitamins; no necessity for dilution; reduction of power and steam consumption and automatic operation.

To enable the perfecting of a satisfactory continuous process for the pasteurization and deodorization of cream and other lacteal liquids or the like under vacuum, it has been found necessary to devise entirely new processes or methods of pasteurizing together with apparatus therefor, such methods of pasteurizing and apparatus therefor being advantageous independently under atmospheric conditions, and accordingly, as pointed out in the claims hereunto appended, such processes of pasteurization and apparatus therefor are claimed independently of their use in a continuous process of pasteurization and deodorization.

It is to be understood, however, that it is not desired to limit the invention to the particular processes of pasteurization hereinafter disclosed as other forms of pasteurizers such as the flash pasteurizers at present in use, could be strengthened and adapted for vacuum pasteurization and deodorization, but with very inferior results.

It is claimed, however, that the present invention is the first in the field to produce a continuous and satisfactory process or method of continuous pasteurization and deodorization under vacuum and accordingly the ambit of the invention is only to be limited in so far as is necessary to support the validity of the annexed claims.

According to the improved method of pasteurization, steam is gently passed in a diffused form into the cream or alternatively the cream is gently passed in a diffused or rain form through the steam.

Such methods of pasteurizing cream comprise gently diffusing steam into a flowing substantially thin body of the fluid to be treated to cause a substantially instantaneous raising of the temperature of the liquid to that required for pasteurizing or alternatively splitting up the cream into small drops such as rain or diffused form, and allowing it to pass through a chamber within which there is steam at a temperature suited for pasteurization, so that the drops of cream are heated to a pasteurizing temperature.

By splitting up the cream into diffused form or drops, the steam can act upon it much more readily with the result that in the comparatively short passage from the entrance to the exit of the pasteurizing vessel, each drop is raised in temperature to that required for pasteurization.

Although the word "drops" has been used as being most suitable for clearly indicating that it is required to split up the cream so as to make it very readily accessible to the steam during its passage within the pasteurizing vessel, it is not desired to limit such splitting up of the cream to "drop" form only, as obviously a thin film or films of cream would be substantially equally accessible to the quick heating action of the steam. The "thin body or drops" will hereinafter be referred to simply as a stream.

To enable the chemical action of acid neutralization to be completed, it is desirable for the cream to be retarded on discharge from the pasteurizer if not used in conjunction with a deodorizer, in which event with the pasteurizer used as an atmospheric arrangement, to avoid creation of vacuum in the pasteurizing chamber by condensation of the steam (with consequent cream locking of said chamber) air vent means are provided.

By the present process (when the pasteurization is associated with deodorizing) a continuous process of pasteurizing and deodorizing lacteal liquids and particularly cream under vacuum which produces an article of sound body and texture, has been devised, such process not subjecting the lacteal liquid to any unduly harmful treatment which will materially impair the resultant article.

Broadly speaking, the invention thus comprises drawing a regulable supply of the lacteal liquid through a suitable "flash" pasteurizer (such as illustrated herein) by the pull of the vacuum evacuating the deodorizer, pasteurizing and partially deodorizing same therein, then by the pull of said vacuum drawing said liquid into the deodorizer, deodorizing same therein, and, if necessary, retarding same therein at a sufficient temperature to ensure adequate pasteurization and neutralization and thence withdrawing same from said deodorizer for any usual further treatment that may be desired.

It will be noted that by this method of treatment, the rate of flow, from the regulable supply means to ejection from the deodorizer, will be absolutely uniform, while the temperature in the pasteurizer and in the deodorizer will be governed by the inches of vacuum therein, and treatment of first grade and refractory cream can be provided for by altering either the vacuum and/or the rate of flow and/or the volume of steam, uncertainty being largely eliminated by this method and uniformity of results substantially ensured.

Provision is, however, made for the degree of vacuum in the pasteurizer and the deodorizer to be independently varied if desired as it will be understood that under most conditions, to obtain effective deodorization, it is necessary to have a greater degree of vacuum in the deodorizer than is permissible in the pasteurizer to obtain adequate pasteurization.

The invention comprises these features and the features and arrangements and combinations of parts hereinafter described and more particularly pointed out in the claims.

In describing the invention, reference will be made to the accompanying drawings in which Figure 1 shows a sectional elevation of a pasteurizer wherein the steam is diffused into the liquid by way of a perforated tube.

Figure 2 shows a sectional elevation of a modified form of pasteurizer wherein the steam is diffused into the liquid by way of slots.

Figure 3 is a sectional end elevation of Figure 2.

Figure 4 shows a pasteurizer of the type shown in Figure 1 as applied to retarding chamber means.

Figure 5 shows a pasteurizer of the type shown in Figure 2 as applied to a deodorizer apparatus, the latter being shown partly in section to show the retarder means therein.

Figure 6 shows a sectional elevation of a pasteurizer wherein pasteurization is effected by passing the liquid in diffused or rain form through the steam.

Figure 7 shows a sectional elevation of a modified form of such apparatus,

Figure 8 shows a pasteurizer of type shown in Figure 7 when used as an atmospheric arrangement along with retarder vessel means.

Figure 9:
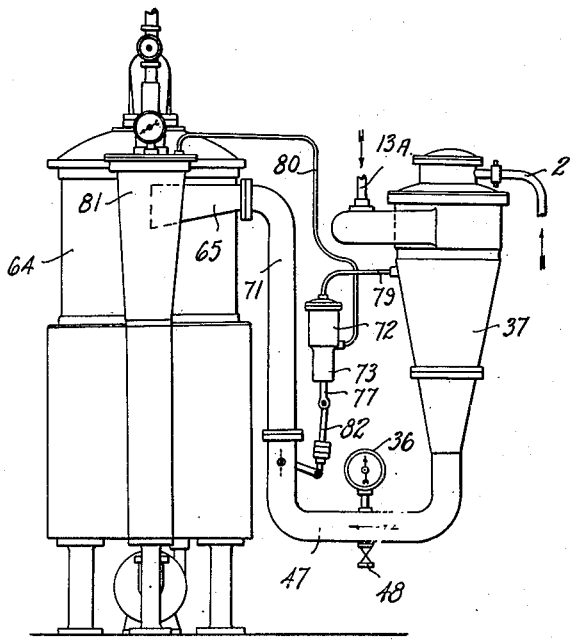
Figure 9 shows a pasteurizer of the type shown in Figure 7 coupled to a deodorizer apparatus and having valve means automatically actuated to control the degree of vacuum applied to the pasteurizer.

Describing first of all the pasteurizer of Figure 1, this comprises a diffuser tube 1 preferably of cylindrical form having one end as the inlet 2, the other as the discharge 3, the inlet end 2 being suitably threaded 4 to enable a supply or feed pipe (not shown) to be coupled thereto, and the discharge end 3 having a preferably right angle branch fitting 5 removably attached thereto, this branch fitting 5 having a gland 6 therein through which a spindle or shaft 7 passes to within the branch fitting 5, a core or diverter 8 attached to this spindle 7, passing centrally along within the diffuser tube 1 to nearly the inlet end 2 thereof.

This core or diverter 8 fills the central space within the diffuser tube 1 leaving only a small annular space 9, said diverter 8 having blades 10 secured thereto adapted to contact the diffuser tube 1, a handwheel 11 or like being attached to the spindle 7 just outside the gland 6 so as to enable the spindle 7 and the attached diverter 8 and blades 10 to be rotated.

If desired, to enable the individual streams of liquid to intermingle during the heating process in annular space 9, the blades 10 could be in sections and staggered in line.

The diffuser tube 1 is surrounded except at its ends by a steam jacket 12, having a steam regulating valve 13 controlling steam flow from a suitable supply source, a baffle 14 for preventing the steam from impinging directly on diffuser tube 1, a safety valve 15, pressure gauge 16, and a drain 17 to a steam trap or like.

The diffuser tube 1 where it is surrounded by the jacket 12 has a multiplicity of small orifices or perforations 18, these being so evenly or symmetrically arranged that any liquid passing in a straight line at any point through the annular space 9 within the diffuser tube 1 would encounter a large and substantially equal number of these orifices.

By way of example, the apparatus could consist of a three inch diffuser tube 1, twenty inches long, perforated with say 4000 $\frac{1}{8}$ inch holes where it is surrounded by steam jacket 12.

The steam jacket 12 it is preferred should be the fixed or rigid member of the unit, the diffuser tube 1, diverter 8 and attached parts of these being adapted by means of suitable detachable joints and union nuts 19 to be readily removable from the jacket 12 for cleaning purposes.

With the modified form of apparatus as shown in Figure 2, in place of the diffuser tube 1 of Figure 1, a series of rings 20 are provided having spaces 21 of about $\frac{1}{8}$ therebetween, these rings 20 each having central bosses 22 to which they are connected by preferably spiral vanes or spokes 23 (see Figure 3) all of the rings 20 being assembled or mounted on a central spindle 24 and disposed in such relation to each other that the vanes would cause liquid passing through the annular space 9 between the rings 20 and their bosses 22 to flow in a spiral direction and not straight through.

The end rings 20 of the assembly, slidably fit within the ends of the steam jacket 12, the outlet 3 being in this case a straight through fitting and the inlet 2 an elbow fitting, this latter having a bore 25 with inner seat 26 for receiving a spindle 27 which has a seated boss 28 adapted to rest on said seat 26, the outer end of the spindle having a handwheel or like 11 secured thereto with a compression spring located therebetween and the elbow fitting to tend to keep the seated boss 28 in close contact with seat 26.

The central spindle 24 to which the rings 20 are secured (by nut means 29 clamping them against spindle shoulder 30) has a preferably square end 31 adapted to freely fit into a square hole in the seated boss 28, the arrangement being such that by rotating handwheel or like 11, the spindle 27, central spindle 24 and rings 20 rotate, and at the same time the detachable joint and union nut means 19 permit of ready detachment of the various parts from the steam jacket 12 for cleaning purposes.

The steam inlet pipe 13A with valve 13 may pass tangentially into the steam jacket 12 to prevent direct impingement of the steam on to the rings 20.

Engaging within the spaces 21 between the rings 20 there are knife blades 32 (see Figure 3) all connected together by lateral rod means 33 and bridge members 34, these latter being secured to the steam jacket 12 in such manner that by unscrewing the external nut means 35, the whole of the blades 32 can be withdrawn from engagement within the spaces 21, thus permitting the rings 20 to be withdrawn laterally, when so desired for cleaning purposes.

Obviously, instead of the straight blades 32 as shown, said blades could be of circular form and permitted to rotate on a shaft which could be raised as desired in similar manner to that described.

A thermometer 36 is preferably fitted to the outlet 3.

With the two forms of pasteurizer described as in Figures 1 and 2, pasteurization is effected by diffusing steam into the liquid, but in the pasteurizers of Figures 6 and 7, this process is reversed, the liquid being passed in diffused or rain form through the steam.

The apparatus of Figure 6 comprises a pasteurizing chamber 37 preferably cylindrical in form with top and bottom pipes 38 and 39 secured thereto in a manner, as by joints 40, permitting ready detachment of said chamber 37 from said pipes 38 and 39, the top pipe 38 being gradually reduced in diameter from say, eleven inches at the top of the chamber 37 to four inches at its upper part 41, this latter preferably having a right angle bend to prevent excessive height.

The top pipe 38 forms an expansion chamber for steam admitted thereto from the steam pipe 13A with control valve 13, before said steam passes into the pasteurizing chamber 37, so that the steam meets the liquid at a pressure only slightly above atmospheric.

Secured to the top pipe or expansion chamber 38 just above the pasteurizing chamber 37, a hollow spray ring 42 is secured having small orifices 43 (say 720 $\frac{1}{16}$ holes in a nine inch ring with four inch centre hole) in its bottom face, this spray ring 42 being connected by inlet pipe 2 to a float tank 44 which may be of the type described in previous Letters Patent No. 1,641,349 the source of supply pipe 45 from which the liquid is delivered to said float tank 44 preferably being provided with strainer means 46.

The bottom pipe 39 which in effect is a seal, is connected to the lower end of the pasteurizing chamber 37 and reduced from the size of the latter to say, four inches in diameter, then passing horizontally and upwardly in goose neck or U form 47 to terminate in outlet 3.

A thermometer 36 is provided on the goose neck 47 the latter also having a drain cock 48.

In the apparatus of Figure 7 which is a modified form of that shown in Figure 6, the pasteurizing chamber 37 is of inverted conical form having the spray mechanism mounted to the top thereof.

The spray mechanism comprises a liquid chamber 49 with removable cover 50 and having inlet pipe 2 connected thereto, the spray plate 51 which has the orifices 43 therein in ring form (none in the centre) being seated in the bottom of the chamber 49 and having knob means 52 so that when cover 50 is removed, the spray plate 51 can be lifted out.

The expansion chamber 38A surrounds the upper portion of the pasteurizing chamber 37, the steam gaining admission to the latter from the former by way of a perforated conical distributor 53 which rests on a bead 54 formed in chamber 37 and fits at its top around the bottom of liquid chamber 49.

Sides of the expansion chamber 38A converge outwardly to form an outer extension 55 into which the steam pipe 13A passes with preferably a bell mouthed outwardly faced end 56 within extension 55.

The pasteurizers as illustrated in Figures 1, 2, 6 and 7 may be used as independent units or in conjunction with deodorizing apparatus, but in any event, to complete pasteurization, it is preferable for the liquid after passing through the pasteurizer to be held in retarder means for a period sufficient to complete pasteurization and the chemical action of the neutralizing agent.

Where the pasteurizers are used in conjunction with deodorizer means, a separate vessel for retardation purposes is not necessary as retardation can be effected in the deodorizer.

Considering first of all the use of the pasteurizers as independent units, with those of the type shown in Figures 1 and 2, the retarder vessel in a preferred form comprises a container 57 (see Figure 4) open to the atmosphere but substantially closed at its top by a cover plate 58 having a downwardly projecting cylindrical portion 59 concentric with the container 57, the connection of the container 57 to atmosphere being by way of this cylindrical portion 59.

The container 57 has an outlet pipe 60 situated upwardly from the bottom of the container 57 and projecting to near the said bottom in bend form, a drain 61 also being provided to container 57.

The pasteurizer (as in Figures 1 or 2) is connected with its outlet 3 passing tangentially into the container 57 at the top thereof, the pasteurizer being mounted at a lower level than that at which the outlet 3 is connected to the container 57 to ensure sealing of the pasteurizer.

With the pasteurizers of Figures 6 and 7, as the passing of the liquid through the steam would tend to create a vacuum within the pasteurizing chamber 37, when these pasteurizers are used as independent or atmospheric units, it would be necessary to fit a vacuum and pressure relief valve 62 (of known type) to a convenient point on pasteurizing chamber 37 (see Figure 8).

When so used, the goose neck 47 would be eliminated as the bottom of the bottom pipe 39 projecting into the liquid within the container 57 (Figure 8) would give the desired seal.

The retarder vessel or container 57 in this case would not require the cover plate 58 or portion 59 as in Figure 4 and a simple elevated outlet 60 from container 57 would be satisfactory.

Now considering the pasteurizers when used in conjunction with convenient deodorizing apparatus such as of the type described in Ser. No. 557,858 when pasteurizers of the type shown in Figures 1 or 2 are to be applied, a float tank 44 is coupled to the inlet 2 (see Figure 5) and the pasteurizer vertically connected to the steam scrubber pipe 63 of the deodorizer 64, this scrubber pipe 63 passing as at present in a semi-circular bend across said deodorizer 64 and then horizontally and tangentially thereinto in fishtail form 65.

In view of the steam scrubbing of the liquid while within the pasteurizer, this semi-circular upper portion of the pipe 64 may be eliminated, the latter passing direct to the fishtail 65.

To effect retardation of the liquid within the deodorizer 64 in manner similar to that applied when containers 57 are used, the suction pipe 66, which is the liquid outlet pipe from the deodorizer separator chamber 67 is extended by pipe 68 upwardly within the latter (see Figure 5) said extended pipe 68 being concentrically surrounded by a cylindrical baffle ring 69 which at its top edge is above the top level of extended pipe 68 and is clear of the separator chamber bottom 67, vertical stays or ribs 70 supporting said baffle ring 69 and at the same time acting as antiswirl baffles.

With the pasteurizers as in Figures 6 and 7, the connection to the deodorizer 64 simply comprises an upward pipe 71 (see Figure 9) connected to the goose neck pipe 47, passing horizontally and tangentially into the deodorizer 64 in enlarged fishtail form 65.

In Figure 9, the pasteurizer has, for the purpose of clearness of illustration, been shown as being away from the deodorizer 64, but in actual practice said pasteurizer would preferably be mounted to the side of the deodorizer with suitable brackets fitted thereto so as to form a compact unit.

Figure 10:
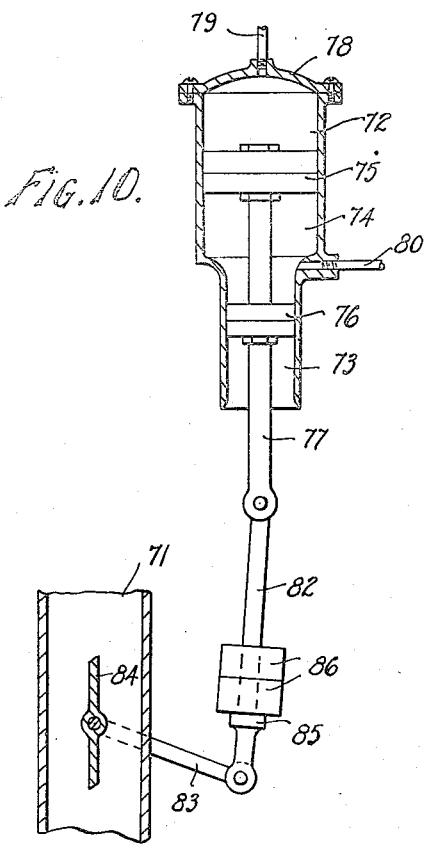
Figure 10 shows an enlarged sectional elevation of the valve and its automatic actuating means.

Under certain circumstances, as it may be desirable to be able to independently vary the degree of vacuum in the pasteurizer and the deodorizer, as under usual conditions to obtain effective deodorization it may be necessary to have a much greater degree of vacuum in the deodorizer, than is permissible in the pasteurizer to obtain adequate and desired pasteurization, suitable means such for instance as the automatically actuated valve means as shown in Figures 9 and 10 are fitted to control the degree of vacuum applied to the pasteurizer.

These automatically actuated valve means comprise a large cylinder 72 (see Figure 10) with smaller cylinder 73 extending concentrically from one end thereof, there being a space 74 between large and small pistons 75 and 76 (which fit their respective cylinders 72 and 73) which is common to both cylinders, the pistons 75 and 76 being connected to a single piston rod 77.

The cylinders 72 and 73 are preferably vertically disposed (as shown) a cover 78 being provided to the top of the large cylinder 72 from which pipe 79 passes to a suitable point on the pasteurizer chamber 37, the space 74 having pipe 80 connected thereto passing to a suitable position on the deodorizer 64, preferably the top of the ejector condenser 81 at which point there would be the full degree of vacuum as applied to said deodorizer 64.

The bottom end of the small cylinder 73 is open, the piston rod 77 passing therethrough to a connecting rod 82 which is connected to a lever 83 which controls the opening and closing operations of preferably a butterfly type valve 84 located in the connecting pipe 71 or upward portion of goose neck 47.

The connecting rod 82 may have a shoulder 85 to receive removable weights 86.

To the connecting rod 82 piston rod 77 or valve lever 83, dash pot means of known type (not shown) may be fitted for the purpose of preventing rapid movements of the valve 84 and the operating members connected thereto.

In operation, for the purpose of simplicity and clearness, it will be considered that the liquid to be pasteurized is cream, although it will be understood that there are liquids other than lacteal liquids which could be pasteurized, such as for instance, fats or oils.

Considering that there is a supply of cream to be treated by the pasteurizer of Figure 1 as an independent unit, said cream would flow by gravity or pump means into the inlet 2 of the diffuser tube 1 at a low pressure (say ½ lb. to the square inch) and the steam pressure in the jacket 12 would be controlled to be just sufficiently in excess to pass gently through the orifices 18 into the cream flowing along the annular space 9 between the diffuser tube 1 and the diverter 8 without allowing cream to flow into the jacket 12.

This would cause the cream and steam to mix with resultant heating of the cream with a minimum of concussion and the cream and steam would pass along the diffuser tube to the branch fitting 5 and through outlet 3 into the retarder vessel or container 57 (see Figure 4).

Due to passing into the latter at the periphery thereof, the cream would (due to the velocity of flow) spiral down within the vessel and be held therein before discharge at the outlet 60 for a period sufficient to enable completion of chemical action of acid neutralization (one minute or so).

While the diffuser tube has cream or like passing through, the heat of the jacket 12 tends to cause a deposit of solids to form a skin on the diffuser tube which, if left, would have an insulating effect and tend to choke the orifices 18.

To prevent this, the handwheel 11 is occasionally turned so as to cause the diverter 8 to rotate with the result that the scraper blades 10 would remove the deposit.

With the pasteurizer of Figure 2, the operation is the same as that just described except in that the steam gently enters the annular space 9 within which the cream is flowing by way of the spaces 21 between the rings 20, and the solids which would deposit due to the heat of jacket 12 and would tend to block the spaces 21, being removed therefrom by the knife blades 32 engaged within said spaces 21, cleaning being effected by rotation of handwheel 11 which causes the rings 20 to rotate.

Now if either pasteurizer of Figures 1 or 2 is applied to a deodorizer 64 as in Figure 5, the operation and control is simplified because the cream and steam come under the influence of vacuum as soon as they pass into the pasteurizer, the cream via the inlet 2 of the pasteurizer from the float tank 44 and steam via diffuser orifices 18 (Figure 1) or ring slots 21 (Figure 2).

It will be assumed that it is necessary to pasteurize at 190° F. This necessitates the use of 11 inches of vacuum in the pasteurizer and the vacuum to be maintained in the deodorizer will therefore be 11 inches plus that required to raise the weight of cream from the bottom of the pasteurizer into the deodorizer 64 via pipe 63.

Thus the cream raised to the desired pasteurizing temperature passes along with the excess steam in a frothy state through pipe 63 and fish tail 65 to the deodorizer and is thereby deodorized in known manner and then swirls to the bottom of the separator chamber 67 to be held or retarded (if desired) by the baffle ring 69 and pipe extension 68 for a period sufficient to effect completion of pasteurization before finally flowing down suction pipe 66.

The excess steam above referred to is that steam in excess of that required to raise the cream in the pasteurizer to pasteurizing temperature and which is necessary to enable satisfactory deodorization to be effected in a deodorizer of the type employed in Serial No. 557,858.

As has already been indicated, it will usually be desirable to provide means for independently varying the degree of vacuum in the deodorizer and in the pasteurizer, apparatus for this purpose having already been described with reference to Figures 9 and 10 of the drawings.

In operation, (see Figures 9 and 10) the areas of the large and small pistons 75 and 76 are such that the high degree of vacuum applied by pipe 80 from the deodorizer 64 to the space 74 acting upon the bottom of large piston 75 and top of small piston 76 will substantially balance the desired lower degree of vacuum of the pasteurizer as applied to the top of large piston 75 by way of pipe 79.

As long as this balance is maintained, the piston rod 77 would remain stationary and the butterfly valve 84 open, but if the degree of vacuum in the pasteurizer should exceed the desired degree, this greater degree would affect the top of large piston 75 and cause same to move upwardly.

This would cause the valve lever 83 to move butterfly valve 84 to give a restriction of passage in the pipe 71 (or 63 of Figure 5) so that it will be obvious that in view of the pasteurizer obtaining its vacuum from the deodorizer 64 by way of this connecting pipe 71, the vacuum within the pasteurizer would fall and the valve mechanism operate to govern the degree of vacuum of the pasteurizer to that lower degree desired.

Let it be assumed that the ratio between the two vacua as adjusted by the valve means is 2¼ to 1, if desired to increase the ratio, this is obtainable by the addition of one or more weights 86 to the connecting rod 82 which will cause a greater degree of vacuum in the pasteurizer to be required to balance the added weights 86.

It may be pointed out that the greater the difference in the respective vacua the greater the temperature drop on issuance of the boiling cream from the butterfly valve 84 and therefore the greater the quantity of vapour formed at that point by utilization of latent heat thus reducing the quantity of excess steam necessary from the boiler for deodorization purposes.

Now considering the operation of the pasteurizers as shown in Figures 6 and 7 used in the first case as atmospheric and independent units (not under vacuum) in both cases the operation is substantially the same, the steam being admitted to the pasteurizing chamber 37 in a manner tending to allow it to expand and lose its superheat and thus fall to a temperature suited for pasteurization.

With such atmospheric use of the pasteurizer, the cream while passing through the steam would cause condensation of the latter and the creation of a degree of vacuum which would tend to hold up the cream within the chamber 37 if it were not for the provision of the vacuum and pressure relief valve 62 which would be set to relieve any vacuum created and would relieve any pressure above the low pressure desired.

The amount of steam admitted to the pasteurizing chamber is controlled to be just sufficient to raise the cream to pasteurizing temperature, and under atmospheric conditions is introduced at a pressure only slightly in excess of atmospheric, the cream falling from the orifices 43 in rain or diffused form, being surrounded by the steam which also fills the central space within the chamber 37 due to there being no orifices in the spray ring 42 of Figure 6 or spray plate 51 of Figure 7 in this vicinity.

In order to be sufficiently long in contact with the steam while the cream is in diffused or rain form, the distance of fall from the spray orifices 43 to the bottom of chamber 37 should be a minimum of about three feet, this fall ensuring the raising of temperature of the cream to that of the steam.

Used as atmospheric machines, the cream would have to be pumped or would flow by gravity to the spray ring 42 (Figure 6) or fluid chamber 49 (Figure 7) and as there would be no necessity for a seal on the inlet pipe 2, a float tank 44 would not be required.

With the pasteurizers of Figures 6 and 7, used in conjunction with a deodorizer apparatus 64, the pasteurizer would have its inlet pipe 2 passing from float tank 44 (Figure 6) and the goose neck pipe 47 connected by pipe 71 to the deodorizer 64, said deodorizer preferably having the retardation means therein as shown in Figure 5.

Assuming that it is desired to pasteurize at 190° F., as with the pasteurizers of Figures 1 and 2, a vacuum of 11 inches would be required in the pasteurizer chamber 37 and the vacuum to be maintained in the deodorizer 64 would be 11 inches plus that required to raise the weight of cream from the goose neck pipe 47 into the deodorizer 64 via pipe 71.

The steam admitted to the pasteurizing chamber 37 under 11 inches of vacuum would fall (due to expansion) to a temperature of 190° F., and the cream drawn by the vacuum through the orifices 43 in spray ring 42 (or spray plate 51 of Figure 7) would rain down through the rarified steam within the pasteurizing chamber 37, becoming heated to 190° F., and being then boiled at this temperature, the boiling cream, containing the condensed steam, together with the uncondensed steam being drawn up by way of the goose neck pipe 47 and pipe 71 into the deodorizer.

The goose neck pipe 47 would tend to cause a certain amount of cream to accumulate therein so as to form a seal and thus minimize direct passage of steam from the pasteurizing chamber 37 to the deodorizer 64.

The cream within the deodorizer 64 may be retarded before delivery therefrom by the retarder means such as previously described and illustrated in Figure 5.

I claim:

1. A method of pasteurizing liquids comprising continuously and gently diffusing steam from the exterior into direct contact with all particles of a flowing, substantially thinned body of the liquid in a container to cause a substantially instantaneous raising of the temperature thereof to that required for pasteurization while maintaining the original qualities of the liquid substantially unimpaired.

2. A continuous method of pasteurizing under vacuum and deodorizing lacteal liquids under vacuum, comprising passing a regulatable supply of the lacteal liquid through a suitable flash pasteurizer at least partly by the pull of a regulatable vacuum evacuating a deodorizer, pasteurizing and partially deodorizing the same therein, fixing the maximum pasteurizing temperature by selecting the degree of vacuum in the pasteurizer, and then by the pull of vacuum in the deodorizer drawing said liquid into the deodorizer, and deodorizing the same therein.

3. A continuous method of pasteurizing and deodorizing lacteal liquids, both under vacuum, comprising drawing a regulatable supply of the lacteal liquid through a suitable flash pasteurizer by the pull of the vacuum evacuating a deodorizer, raising the liquid to pasteurizing temperature while within said pasteurizer by diffusing a desired one of said liquid and steam into the other fixing the maximum pasteurizing temperature by selecting the degree of vacuum in the pasteurizer, and delivering the heated liquid with vapors, and a sufficiency of excess steam for deodorizing purposes into a deodorizer wherein the gaseous vapors and steam are separated from said liquid.

4. A method of pasteurizing liquids comprising splitting up the liquid into small drops of diffused form and continuously and gently diffusing or intermingling together steam and said drops of liquid while the latter is passing through a container, to cause a substantially instantaneous raising of the temperature of said liquid to that required for pasteurization, while maintaining the original qualities of the liquid substantially unimpaired, the pasteurizing temperature being precisely controlled by maintaining a vacuum in the container and by controlling the degree of the said vacuum, the liquid and steam being subjected to said vacuum while the liquid is being raised to its pasteurizing temperature.

5. A method of pasteurizing cream comprising splitting up the cream into small drops of diffused form, and continuously passing it through steam in a container at a temperature suited for pasteurization so that the drops of cream are heated to a pasteurizing temperature, while maintaining the size and quality of butter fat particles substantially unchanged, the pasteurizing temperature being precisely controlled by maintaining a vacuum in the container and by controlling the degree of the said vacuum, the cream and steam being subjected to said vacuum while the cream is being raised to its pasteurizing temperature.

6. A continuous method of pasteurizing under vacuum and deodorizing lacteal liquids under vacuum, comprising drawing a regulatable supply of the lacteal liquid into and through a suitable flash pasteurizer by the pull of the vacuum evacuating a deodorizer, raising the liquid to pasteurizing temperature while within said pasteurizer by diffusing a desired one of said liquid and steam into the other, and delivering the heated liquid with vapors, and a sufficiency of excess steam for deodorizing purposes into a deodorizer wherein the gaseous vapors and steam are separated from said liquid, the pasteurizing temperature being precisely controlled by maintaining a vacuum in the pasteurizing container and by controlling the degree of said vacuum, the liquid and steam being subjected to said vacuum in said container while the liquid is being raised to its pasteurizing temperature.

7. A method of pasteurizing liquids, comprising continuously diffusing or intermingling together steam and a substantially thin stream of liquid while the latter is passing through a container which is under the influence of a predetermined and maintained degree of vacuum, to cause a substantially instantaneous raising of the temperature of said liquid to that required for pasteurizing as determined by said degree of vacuum.

8. A method of pasteurizing liquids, comprising continuously and gently diffusing or intermingling together steam and a substantially thin stream of liquid while the latter is passing through a container which is under the influence of a predetermined and maintained degree of vacuum, to cause a substantially instantaneous raising of the temperature of said liquid to that required for pasteurizing as determined by said degree of vacuum, while maintaining the original physical properties of the liquid substantially unimpaired.

9. A method of pasteurizing and deodorizing liquids, comprising continuously diffusing or intermingling together steam and a substantially thin stream of liquid, while passing the latter through a pasteurizer which is under the influence of a predetermined and maintained degree of vacuum, to cause a substantially instantaneous raising of the temperature of said liquid to that required for pasteurizing as determined by said degree of vacuum, then by the pull of the vacuum in the deodorizer drawing the liquid from the pasteurizer into the deodorizer, and deodorizing the liquid therein.

10. A method of pasteurizing and deodorizing liquids, comprising continuously diffusing or intermingling together steam and a substantially thin stream of liquid, while passing the latter through a pasteurizer which is under the influence of a predetermined and maintained degree of vacuum, to cause a substantially instantaneous raising of the temperature of said liquid to that required for pasteurizing as determined by said degree of vacuum, then by the pull of the vacuum in the deodorizer drawing the liquid from the pasteurizer into the deodorizer, and deodorizing the liquid therein, and maintaining a degree of vacuum in said deodorizer sufficiently higher than that in said pasteurizer to pull the liquid from the pasteurizer into the deodorizer and to there produce the desired deodorization, while still leaving sufficient vacuum in the pasteurizer to accomplish pasteurization at the desired temperature.

HENRY LAMONT MURRAY.